United States Patent [19]

Hembree et al.

[11] Patent Number: 5,106,500
[45] Date of Patent: Apr. 21, 1992

[54] PORTABLE WATER PURIFICATION SYSTEM INCLUDING A FILTER CLEANING MECHANISM

[75] Inventors: Richard D. Hembree; Brian F. Sullivan; David E. E. Carmein, all of Minneapolis, Minn.

[73] Assignee: Recovery Engineering, Inc., Minneapolis, Minn.

[21] Appl. No.: 541,052

[22] Filed: Jun. 20, 1990

[51] Int. Cl.⁵ .................... B01D 24/08; B01D 35/16
[52] U.S. Cl. .................... 210/266; 210/414; 210/415; 210/276; 210/282; 210/416.3; 210/764
[58] Field of Search ............ 210/413, 414, 415, 276, 210/282, 266, 501, 764, 206, 416.3

[56] References Cited

U.S. PATENT DOCUMENTS

| | | | |
|---|---|---|---|
| Re. 32,537 | 11/1987 | Drori | 210/355 |
| 492,161 | 2/1893 | Hill | 210/414 |
| 1,130,725 | 3/1915 | Getts | 210/414 |
| 1,386,340 | 8/1921 | Wuster | 210/359 |
| 1,510,863 | 10/1924 | Rose | 210/413 |
| 1,689,277 | 10/1928 | Burns | 210/414 |
| 1,800,757 | 4/1931 | Schlosser | 210/414 |
| 1,987,142 | 1/1935 | Clements, Jr. | 210/167 |
| 1,994,656 | 3/1935 | Liddel | 210/412 |
| 2,338,417 | 1/1944 | Forrest et al. | 210/412 |
| 2,338,418 | 1/1944 | Forrest et al. | 210/412 |
| 2,338,419 | 1/1944 | Forrest et al. | 210/412 |
| 2,566,371 | 9/1951 | Quinn | 210/416.3 |
| 2,670,081 | 2/1954 | Quinn | 210/120 |
| 2,869,724 | 1/1959 | McDevitt | 210/94 |
| 3,316,173 | 4/1967 | Mills | 210/62 |
| 3,327,859 | 6/1967 | Pall | 210/266 |
| 3,379,312 | 4/1968 | Brown | 210/415 |
| 3,425,790 | 2/1969 | Sloan | 21/2 |
| 3,436,345 | 4/1969 | Goodenough et al. | 210/62 |
| 3,462,363 | 8/1969 | Mills | 210/37 |
| 3,817,860 | 6/1974 | Lambert et al. | 210/29 |
| 3,870,639 | 3/1975 | Moore et al. | 210/359 |
| 3,923,665 | 12/1975 | Lambert et al. | 210/501 |
| 3,932,277 | 1/1976 | McDermott et al. | 210/77 |
| 4,076,622 | 2/1978 | Costin | 210/64 |
| 4,151,092 | 4/1979 | Grimm et al. | 210/261 |
| 4,187,183 | 2/1980 | Hatch | 210/29 |
| 4,190,529 | 2/1980 | Hatch | 210/29 |
| 4,238,477 | 12/1980 | Lambert et al. | 210/501 |
| 4,298,475 | 11/1981 | Gartner | 210/266 |
| 4,389,311 | 6/1983 | LaFreniere | 210/198.1 |
| 4,420,590 | 12/1983 | Gartner | 525/357 |
| 4,483,771 | 11/1984 | Koch | 210/490 |
| 4,594,392 | 6/1986 | Hatch | 525/327.1 |
| 4,632,757 | 12/1986 | Rosenberg | 210/427 |
| 4,769,143 | 9/1988 | Deutsch et al. | 210/266 |
| 4,800,018 | 1/1989 | Moser | 210/266 |
| 4,894,154 | 1/1990 | Roz et al. | 210/266 |
| 4,913,808 | 4/1990 | Haque | 210/93 |

FOREIGN PATENT DOCUMENTS

| | | |
|---|---|---|
| 40046 | 2/1976 | Israel . |
| 148993 | 8/1921 | United Kingdom . |
| 467134 | 6/1937 | United Kingdom . |

OTHER PUBLICATIONS

Product Literature from Fisher Scientific.
Product Data of First Need ® Purifier.
Product Data on Water Tech Water Purifier.
Product Data on Katadyn Pocket Filter.
Marchin and Fina, "Contact and Demand-Release Disinfectants," *Critical Reviews in Environmental Control*, vol. 19, pp. 277-289.

*Primary Examiner*—Stanley S. Silverman
*Assistant Examiner*—Cynthia L. Nessler
*Attorney, Agent, or Firm*—Merchant, Gould, Smith, Edell, Welter & Schmidt

[57] ABSTRACT

A water purification system including both a filter and a body of biocidally active material for microbiologically purifying biologically contaminated water. The system provides for the production of microbiologically purified water during both upstroke and downstroke of the plunger and includes a brush which can be reciprocated within the system for cleaning the filter.

13 Claims, 8 Drawing Sheets

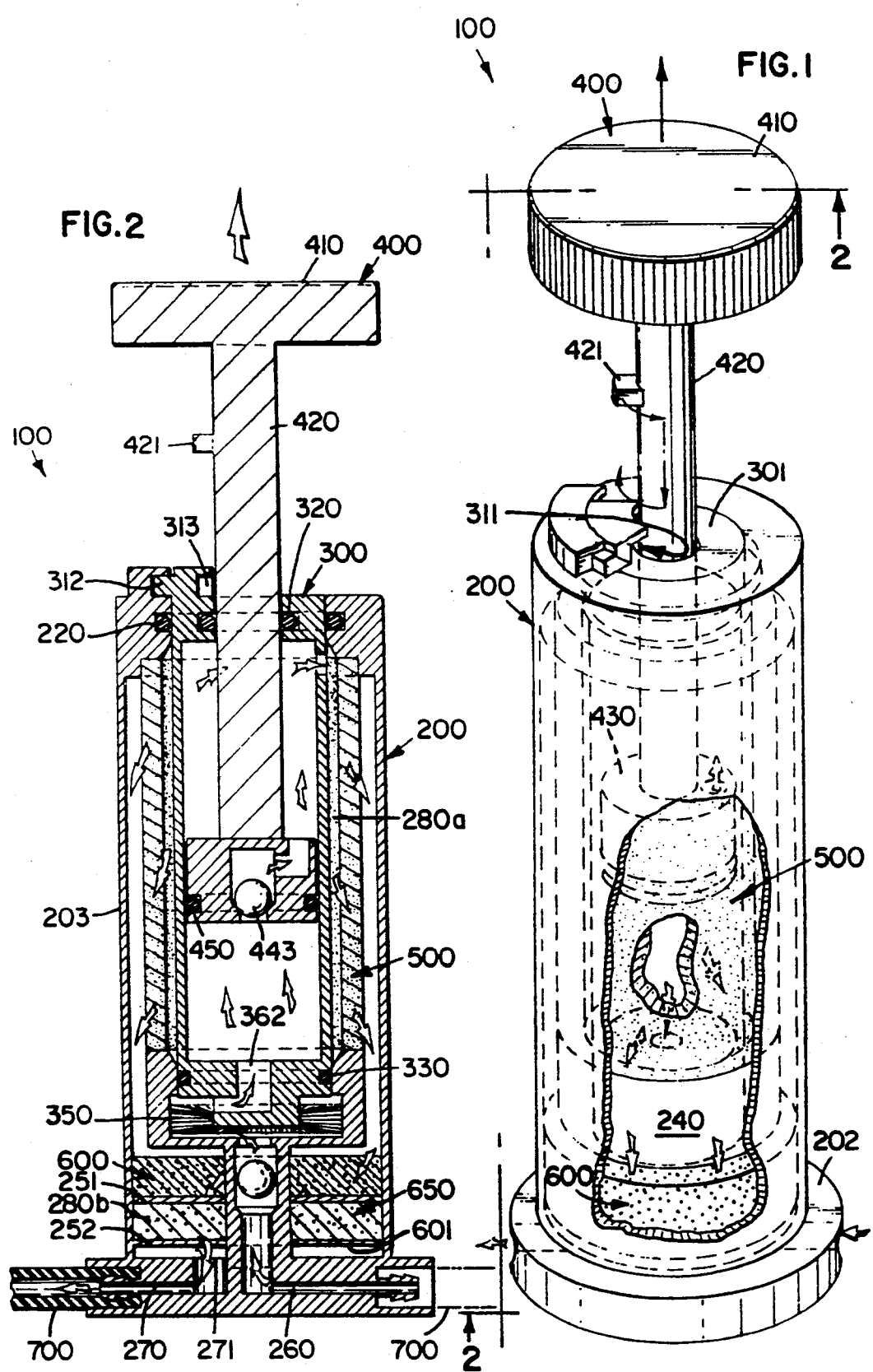

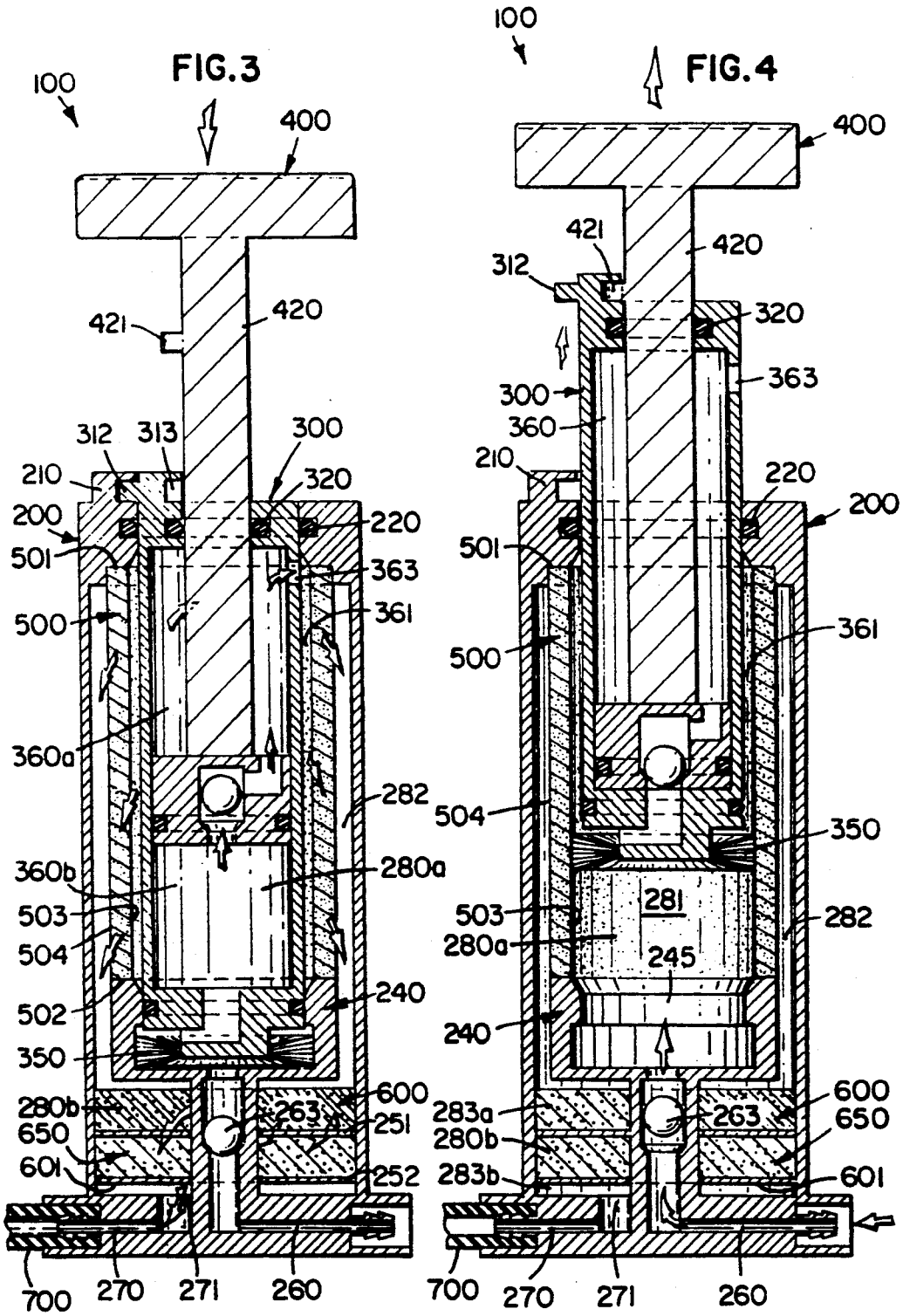

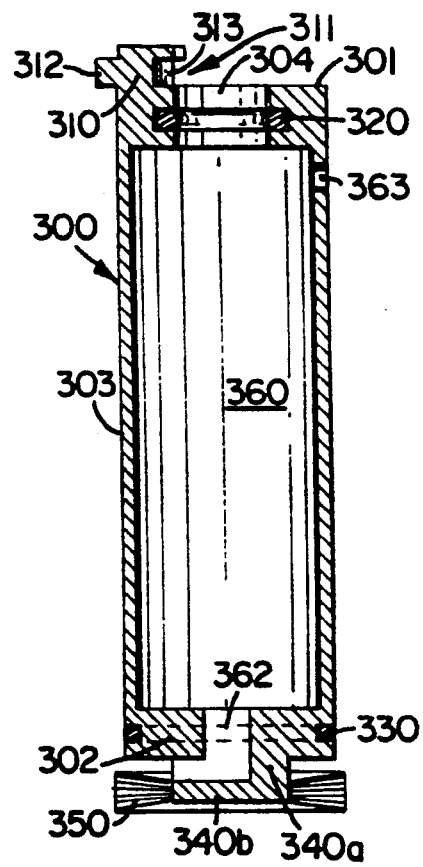
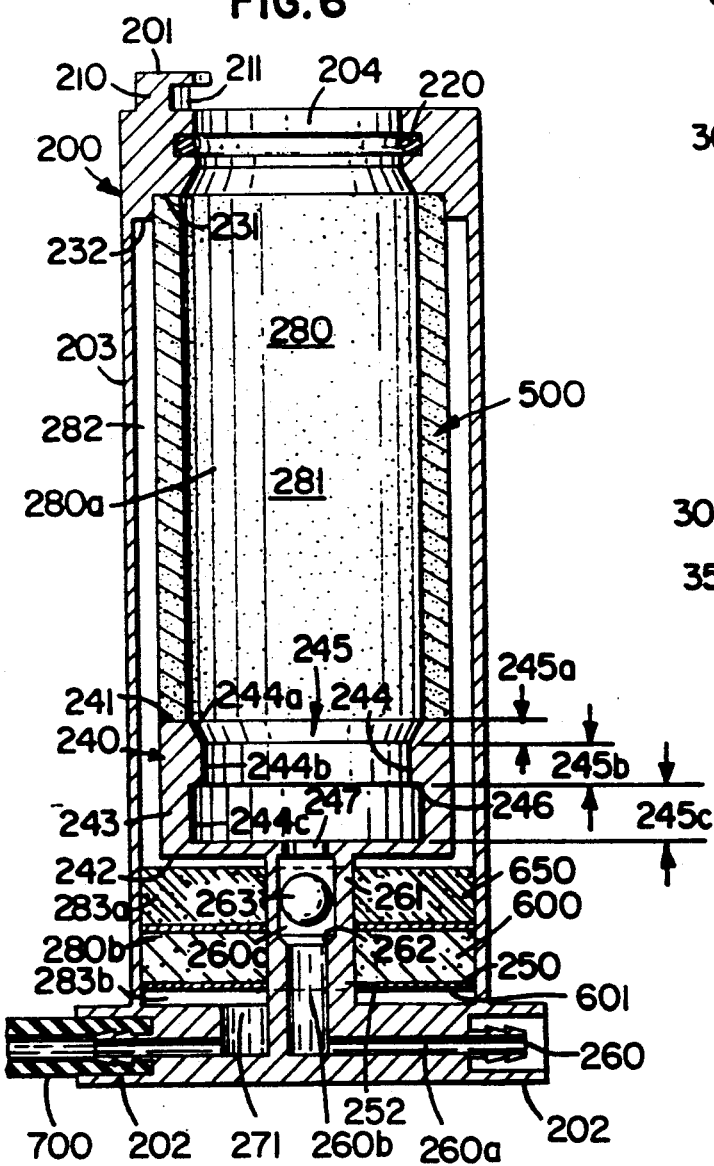

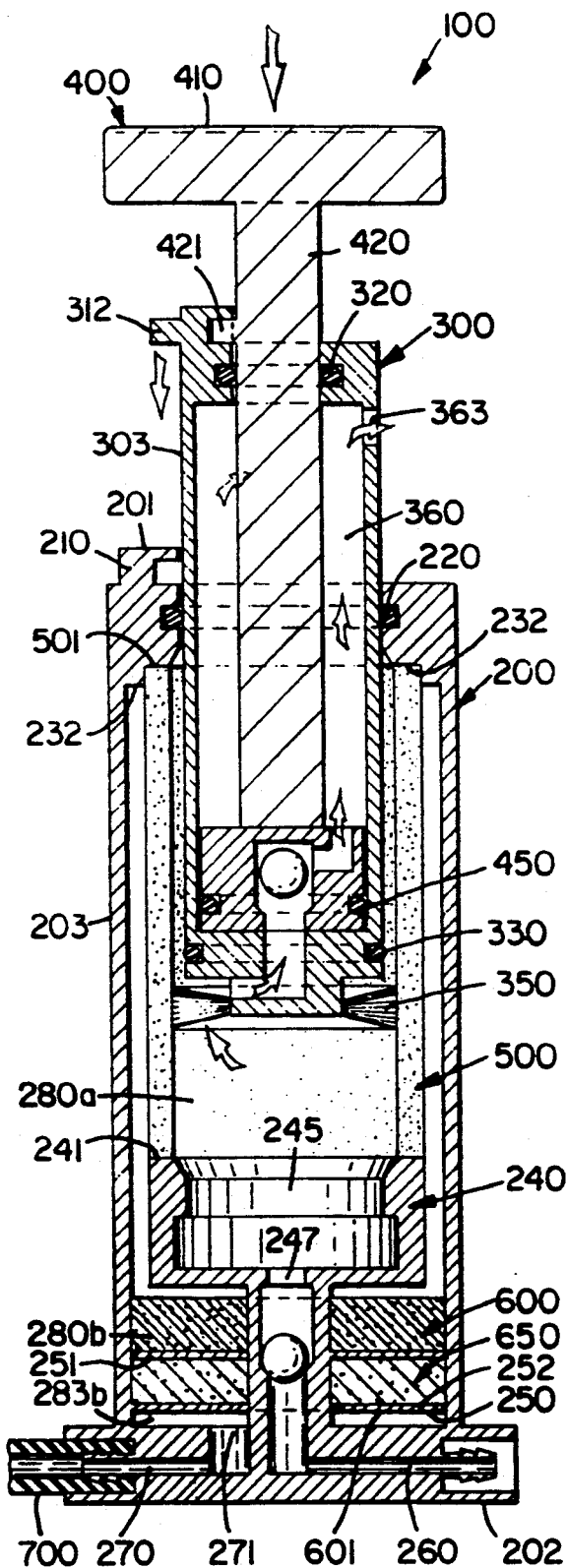
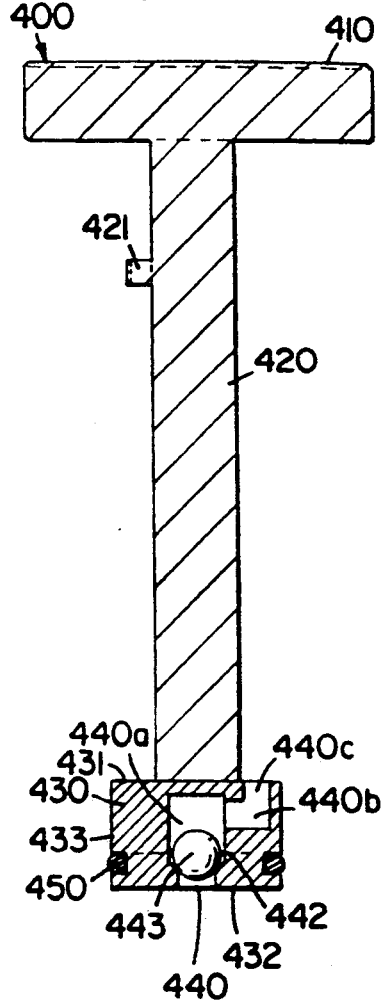

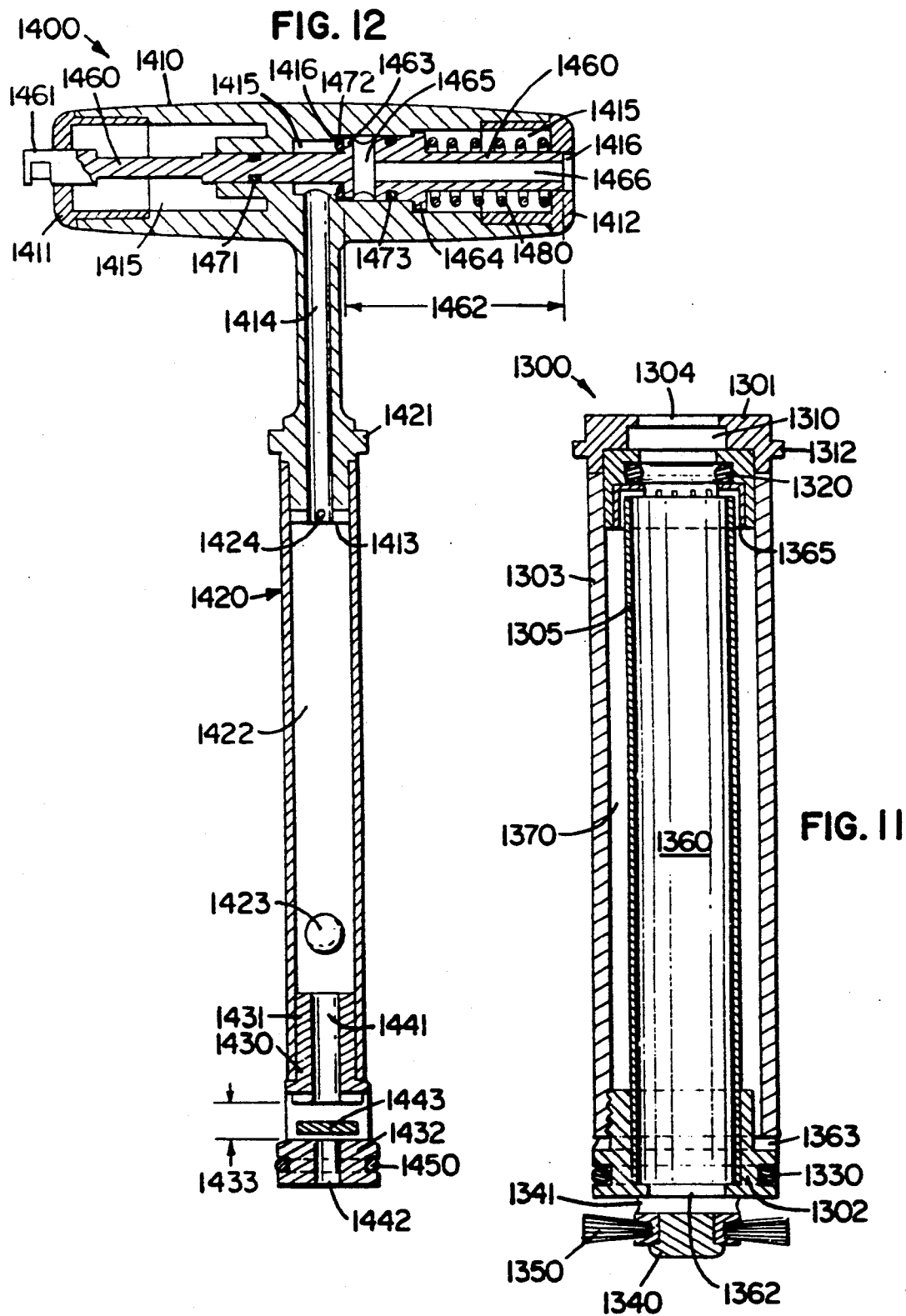

PORTABLE WATER PURIFICATION SYSTEM INCLUDING A FILTER CLEANING MECHANISM

TECHNICAL FIELD

Broadly, the invention relates to water purification systems. Specifically, the invention relates to portable water purification systems which include a filter for physically removing particulate contaminants and larger pathogens from the water, a porous body of biocidally effective material for chemically disinfecting the water, and a means for cleaning the filter media so as to remove contaminants entrapped against the filter.

BACKGROUND

Sources of fresh water are often contaminated with disagreeable suspended solids and/or harmful pathogens including parasites such as schistosoma, cysts such as Giardia, bacteria such as cholera and viruses such as hepatitis.

Various methods are available for producing potable water from fresh water sources contaminated with suspended solids and/or pathogens. Selection of the most appropriate method requires assessment and balancing of the output requirements of the system, energy availability, and size restrictions.

One of the more constraining situations in the design of a purification system is the design of a readily transportable system capable of microbiologically purifying water contaminated with both larger pathogens such as cysts, which can be as large as about 6 microns in diameter and substantially resistant to chemical disinfection, and smaller pathogens such as viruses, which can be as small as about 0.05 microns in diameter and extremely difficult to remove by filtration.

One method employed to microbiologically purify contaminated water attempts to chemically disinfect the water by dissolving a biocide into the water or percolating the water through a biocidally active porous resin. Exemplary of the chemical disinfection method are U.S. Pat. Nos. 4,151,092 and 4,298,475.

U.S. Pat. No. 4,151,092, issued to Grimm et al., discloses a portable water purification system that includes (i) a supply of biocidally effective tablets, (ii) a first container for retaining a supply of contaminated water treated with the biocide disinfectant, (iii) a second container sealingly receivable within the first container for exerting pressure upon the treated water contained within the first container when forced downward into the first container, and (iv) a replaceable filter cartridge coupled to the base of the second container for filtering the treated water retained within the first container as the water is forced from the first container into the second container. The filter cartridge includes a polyethylene filter to remove suspended solids, a layer of activated carbon to remove the biocide and other distasteful contaminants, and a layer of felt to retain the activated carbon. While generally effective, chemical disinfection requires that the contaminated water be treated for upwards of thirty minutes with the biocide prior to removal of the biocide by passage through the activated carbon and/or consumption of the water.

U.S. Pat. No. 4,298,475, issued to Gartner, discloses a disposable, portable water purification system operable by mouth suction which comprises a straw sequentially containing filter media for removing suspended solids from the water, biocidally active anion exchange resin for chemically disinfecting the water, filter media for further removing suspended solids, activated carbon for removing distasteful contaminants including residual disinfecting chemical, and filter media for retaining the activated carbon. Gartner does not discuss the pore sizes of the filter medias.

A second method employed to microbiologically purify contaminated water attempts to filter the pathogens from the contaminated water by employing a filter having a pore size effective to remove all pathogens. While this method can be effective for removing the larger pathogens such as cysts and bacteria, such systems are generally ineffective for removing the smaller pathogens such as viruses, require significant operating energy, produce modest quantities of filtered water, and require frequent filter replacement.

U.S. Pat. Nos. 492,161, 1,130,725 and 1,510,863 disclose cleanable filtration systems which include a filter media and manually operable brushes for scrubbing the surface of the filter media in contact with the contaminated water. However, these cleanable filtration systems are not designed for use in a portable system as they rely upon a source of pressurized water.

Accordingly, a substantial need exists for a simple and efficient, manually operable, portable, water purification system that can produce significant quantities of microbiologically purified water with minimal effort and includes a means for efficiently cleaning the filter media so as to increase the useful life of the system without replacing the filter.

BRIEF DESCRIPTION OF THE DRAWINGS

FIG. 1 is a perspective view of a first embodiment of the invention.

FIG. 2 is a cross-sectional front view of the invention embodiment depicted in FIG. 1 taken along line 2—2 wherein the plunger is moving upward.

FIG. 3 is a cross-sectional view of the invention embodiment depicted in FIG. 2 wherein the plunger is moving downward.

FIG. 4 is a cross-sectional view of the invention embodiment depicted in FIG. 2 wherein a combination of the plunger and the secondary container are moving upward.

FIG. 5 is a cross-sectional view of the invention embodiment depicted in FIG. 2 wherein a combination of the plunger and the secondary container are moving downward.

FIG. 6 is a cross-section front view of the primary container depicted in FIG. 1.

FIG. 7 is a cross-sectional front view of the secondary container depicted in FIG. 1.

FIG. 8 is a cross-sectional front view of the plunger depicted in FIG. 1.

FIG. 11 is a cross-sectional front view of the secondary container depicted in FIG. 9.

FIG. 12 is a cross-sectional front view of the plunger depicted in FIG. 9.

SUMMARY

An apparatus for producing potable water from contaminated water which includes (i) a primary container defining a primary chamber, (ii) a filter sealingly dividing the primary chamber into a first cavity and a second cavity with a first surface of the filter facing the first cavity and a second surface of the filter facing the second cavity, (iii) a means for brushing the first surface of the filter so as to remove contaminants entrapped against the first surface of the filter, and (iv) a manually operable plunger reciprocally and sealingly retained within the first cavity wherein the plunger is operable in a first operational mode for forcing contaminated water retained within the first cavity through the filter, and operable in a second operational mode for activating the brushing means for removing contaminants entrapped against the first surface of the filter.

The apparatus is preferably designed such that the first and second operational modes are substantially mutually exclusive such that reciprocation of the plunger when in the first operational mode does not activate the brushing means for removing contaminants from the filter and reciprocation of the plunger when in the second operational mode preferentially directs the contaminated water containing the contaminants removed from the first surface of the filter directly out of the apparatus rather than through the filter.

The apparatus also preferably includes a body of biocidally effective material operably positioned within the second cavity for disinfecting the filtered water. Such a combination of filter media and biocidally effective material is capable of providing microbiologically purified water using a macroporous filter media as the filter media need only remove suspended solids and the larger pathogens such as cysts which are substantially resistant to chemical disinfection.

DETAILED DESCRIPTION OF TWO EMBODIMENTS OF THE INVENTION INCLUDING A BEST MODE

The invention is a manually operable, portable water purification system capable of producing significant quantities of potable water from water contaminated with suspended solids and/or pathogens. The system includes a means for cleaning the contaminated water contacting surface of the filter media so as to release and remove contaminants entrapped against the filter and thereby increase the useful life of the filter.

Figure 9:
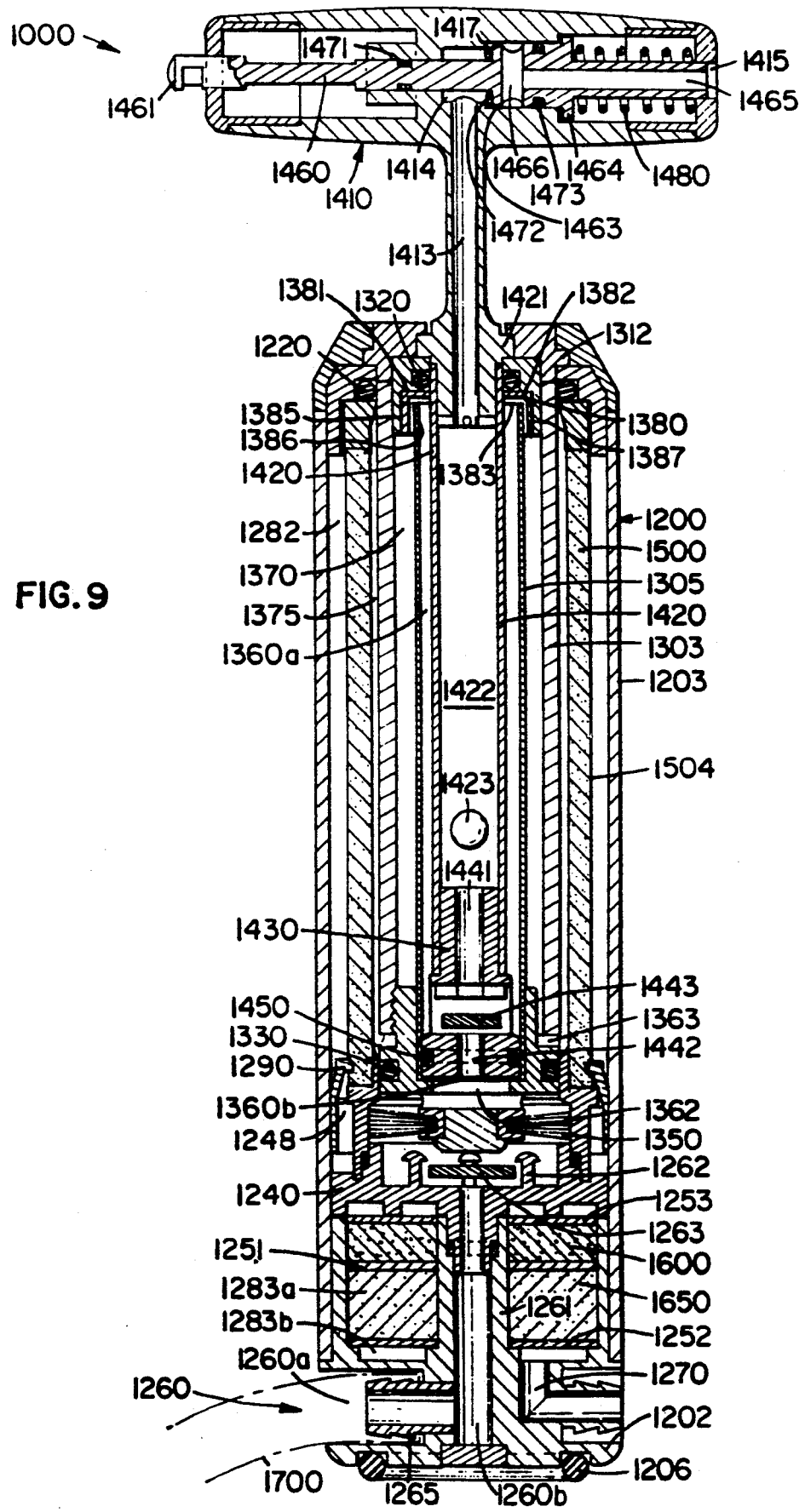
FIG. 9 is a perspective view of a second embodiment of the invention.
Figure 10:
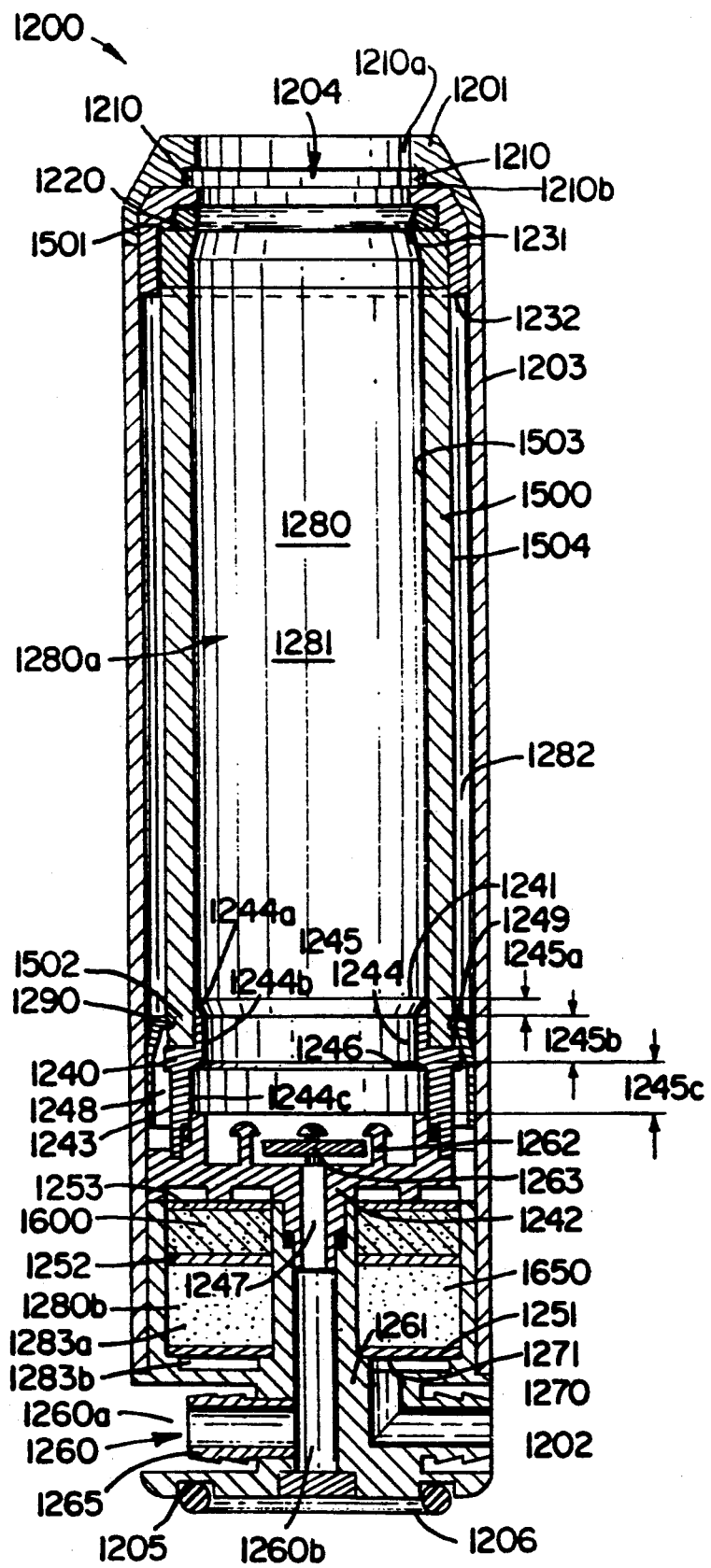
FIG. 10 is a cross-section front view of the primary container depicted in FIG. 9.
Figure 13:
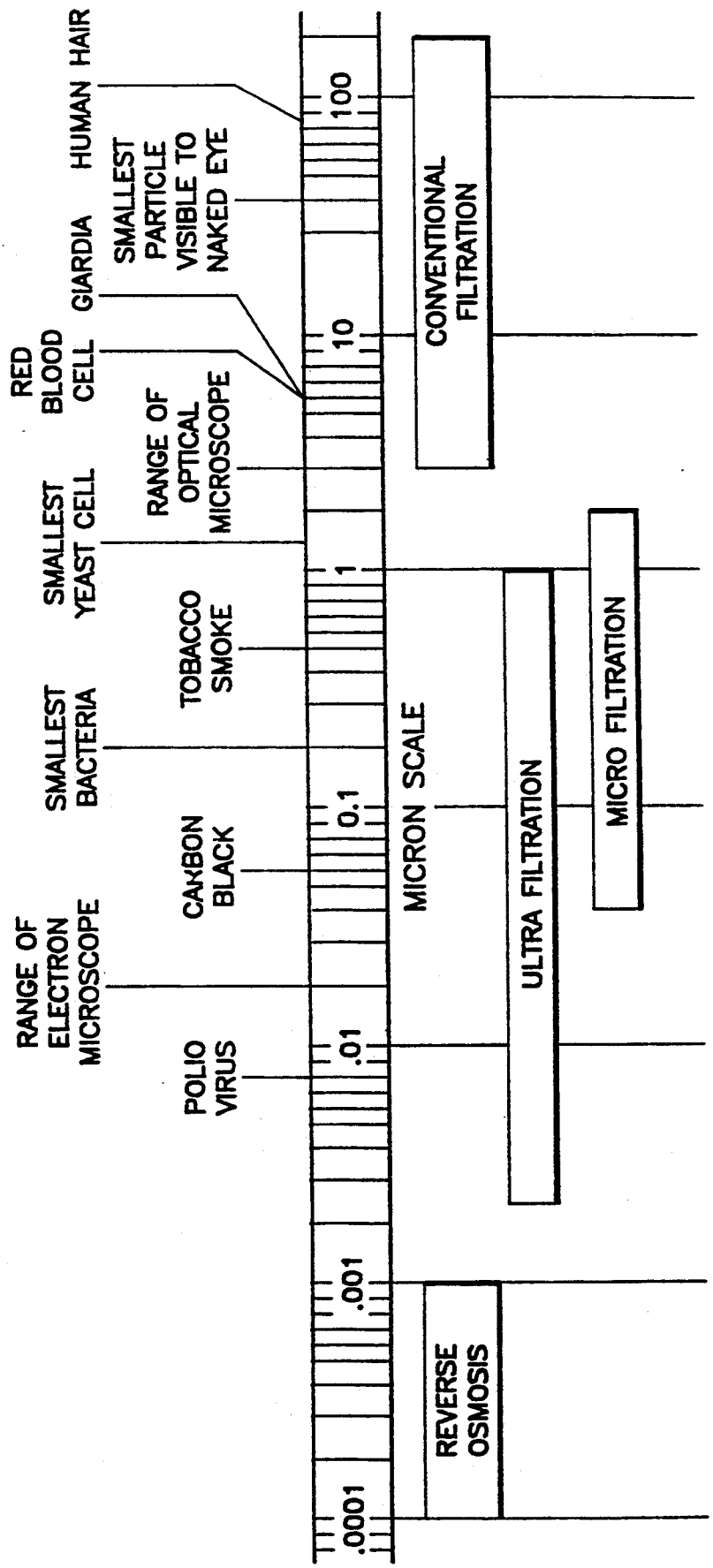
FIG. 13 is a logarithmic micron scale indicating the sizes of various particles.

The system will be described with respect to both a first invention embodiment depicted in FIGS. 1–8 employing reference numerals between 100 and 999 and a second invention embodiment depicted in FIGS. 9–14 employing reference numerals between 1000 and 1999.

FIRST EMBODIMENT

Nomenclature

100: water purification system
200: primary container
201: top of primary container
202: base of primary container
203: sidewall of primary container
204: opening through top of primary container
210: arcuate inverted L-shaped projection
211: arcuate channel
220: annular primary seal
231: upper inner annular horizontal flange
232: lower inner annular horizontal flange
240: retainer
241: top of retainer
242: base of retainer
243: sidewall of retainer
244: inner surface of retainer sidewall
244a: upper portion of retainer inner sidewall surface
244b: middle portion of retainer inner sidewall surface
244c: lower portion of retainer inner sidewall surface
245: retainer compartment
245a: upper portion of retainer compartment
245b: middle portion of retainer compartment
245c: lower portion of retainer compartment
246: inner annular horizontal flange on retainer
247: inlet orifice through base of retainer
251: first screen
252: second screen
260: inlet passageway through base of primary container
260a: horizontal portion of inlet passageway
260b: vertical portion of inlet passageway
260c: valved portion of inlet passageway
261: vertical conduit
262: angled inner sidewall portion of vertical conduit
263: sphere
270: outlet passageway through base of primary container
271: outlet orifice in base of primary container
280: primary chamber
280a: upper portion of primary chamber
280b: lower portion of primary chamber
281: primary central cylindrical cavity
282: outer annular cavity
283a: uppermost section of lower portion of primary chamber
283b: lowermost section of lower portion of primary chamber
300: secondary container
301: top of secondary container
302: base of secondary container
303: sidewall of secondary container
304: opening through top of secondary container
310: arcuate inverted L-shaped projection
311: arcuate channel
312: arcuate rib
313: enclosed end of arcuate channel
320: upper annular secondary seal
330: lower annular secondary seal
340a: extension leg
340b: plate
350: bristles
360: secondary chamber
360a: upper portion of secondary chamber
360b: lower portion of secondary chamber
361: inner annular cavity
362: inlet orifice through base of secondary container
363: outlet orifice through sidewall of secondary container
400: plunger
410: head of plunger
420: shaft of plunger
421: transverse locking projection
430: base of plunger
431: top of plunger base
432: bottom of plunger base
433: sidewall of plunger base
440: inlet passageway through plunger base
440a: valved portion of inlet passageway
440b: horizontal portion of inlet passageway
440c: vertical portion of inlet passageway
442: angled inner sidewall portion of inlet passageway
443: sphere 450: plunger seal
500: filter media
501: top of filter media
502: bottom of filter media
503: inner surface of filter media
504: outer surface of filter media
600: biocidally effective material
650: optional active component
651: lower surface of optional active component
700: tube Construction The system 100 includes (i) a cylindrical primary container 200 which accommodates a cylindrical filter 500 and a porous body of biocidally effective material 600, (ii) a cylindrical secondary container 300 reciprocally and sealably retained within the primary container 200 for retaining a quantity of contaminated water (not shown) to be purified and including bristles 350 for brushing the inner surface 503 of the filter 500 when the secondary container 300 is reciprocated within the primary container 200, and (iii) a plunger 400 reciprocally and sealably retained within the secondary container 300 for drawing contaminated water into the secondary container 300 and for forcing the contaminated water drawn into the secondary container 300 through the filter 500 and the porous body of biocidally effective material 600.

The primary container 200 defines a substantially cylindrical primary chamber 280 extending from the top 201 to the base 202 of the primary container 200. A central circular opening 204 extends through the top 201 of the primary container 200 for providing access to the primary chamber 280.

An inverted L-shaped projection 210 extends upward from the top 201 of the primary container 200 and arcuately about the opening 204 through the top 201 of the primary container 200. The projection 210 cooperates with the top 201 of the primary container 200 to define an arcuate channel 211 which is inwardly open towards the opening 204.

The inner surface (unnumbered) of the primary container sidewall 203 proximate the top 201 of the primary container 200 is contoured to define upper 231 and lower 232 inner annular horizontal flanges which increase the diameter of the primary chamber 280 as the chamber progresses towards the base 202 of the primary container 200.

A cylindrical retainer 240 having an open top 241 is provided within the primary chamber 280. The cylindrical retainer 240 defines a substantially cylindrical, upwardly open compartment 245. The retainer 240 subdivides the primary chamber 280 into an upper portion 280a, a lower portion 280b, the compartment 245, and an annular passageway 248 between the retainer sidewall 243 and the primary container sidewall 203 which interconnects the upper 280a and the lower 280b portions.

The inner surface 244 of the retainer sidewall 243 is configured to provide a downwardly and inwardly angled upper portion 244a which defines an upper frustromal portion 245a of the compartment 245, a middle portion 244b which defines a cylindrical middle portion 245b of the compartment 245, and a lower portion 244c which defines a cylindrical lower portion 245c of the compartment 245. The lower portion 245c of the compartment 245 has a slightly larger diameter than the middle section 245b so as to define an inner annular horizontal flange 246 between the middle portion 244b and the lower portion 244c. The middle portion 244b of the inner sidewall surface 244 presents the innermost surface within the compartment 245.

An inlet orifice 247 is provided through the base 242 of the retainer 240.

A cylindrical filter 500 is accommodated within the upper portion 280a of the primary chamber 280. The top 501 and bottom 502 of the filter 500 are sealingly coupled to the upper inner annular horizontal flange 231 and the top 241 of the retainer 240, respectively. The filter 500 separates the upper portion 280a of the primary chamber 280 into a primary central cylindrical cavity 281 and an outer annular cavity 282 encircling the primary central cylindrical cavity 281.

The inner surface 503 of the filter 500 and the inner surface 244 of the retainer 240 are vertically aligned so that the primary central cylindrical cavity 281 and the compartment 245 extend continuously from the opening 204 through the top 201 of the primary container 200 to the base 242 of the retainer 240.

An inlet passageway 260 is provided through the base 202 of the primary container 200 for permitting the flow of contaminated water from a source of contaminated water into the compartment 245. The inlet passageway 260 includes a horizontal portion 260a which extends through the base 202 of the primary container 200, a vertical portion 260b which extends from the horizontal portion 260a towards the base 242 of the retainer 240, and a valved portion 260c which completes extension of the inlet passageway 260 to the inlet orifice 247 through the base 242 of the retainer 240. The valved portion 260c of the inlet passageway 260 has a diameter slightly larger than both the vertical portion 260b of the inlet passageway 260 and the inlet orifice 247 through the base 242 of the retainer 240. A sphere 263 having a diameter larger than the diameter of the vertical portion 260b of the inlet passageway 260 and the inlet orifice 247 through the retainer 240 yet smaller than the diameter of the valved portion 260c of the inlet passageway 260 is retained within the valved portion 260c of the inlet passageway 260. The valved portion 260c of the inlet passageway 260 includes an angled inner sidewall surface portion 262 at the juncture of the valved portion 260c and the vertical portion 260b against which the sphere 263 will sealingly engage when flow is attempted from the compartment 245 out through the inlet passageway 260.

The vertical 260b and valved 260c portions of the inlet passageway 260 are defined by a vertical conduit 261 which also serves to support the retainer 240 above the base 202 of the primary container 200. The vertical conduit 261 occupies a central section of the lower portion 280b of the primary chamber 280 so as to shape the lower portion 280b of the primary chamber 280 as an annular cavity.

An outlet passageway 270 is provided through the base 202 of the primary container 200 for permitting the flow of potable water out of the system 100. An outlet orifice 271 places the outlet passageway 270 in fluid communication with the lower portion 280b of the primary chamber 280.

A first annular screen 251 is positioned within the lower portion 280b of the primary chamber 280 for separating the lower portion 280b into an uppermost section 283a in direct fluid communication with the outer annular cavity 282 and a lowermost section 283b in direct fluid communication with the outlet passageway 270 through the base 202 of the primary container 200.

The uppermost section 283a of the lower portion 280b of the primary chamber 280 is packed sequentially with porous biocidally active material 600 and an optional active component 650. A second annular screen 252 separates the biocidally effective material 600 and the optional active component 650. The first annular screen 251 prevents the biocidally effective material 600 from occupying the lowermost section 283b of the lower portion 280b of the primary chamber 280 and/or flowing out of the system 100 through the outlet passageway 270. The void volume defined by the lowermost section 283b of the lower portion 280b of the primary chamber 280 permits purified water to exit from the body of optional active compound 650 along the entire lower surface 651 thereof and then flow substantially unhindered to the outlet orifice 271 and out of the system 100.

A cylindrical secondary container 300 is reciprocally and sealingly retained within the primary central cylindrical cavity 281 with a lowermost portion (unnumbered) reciprocally and sealingly retained within the retainer compartment 245. The secondary container 300 divides the primary central cylindrical cavity 281 into a secondary chamber 360 within the secondary container 300 and an inner annular cavity 361 between the sidewall 303 of the secondary container 300 and the filter 500.

An inverted L-shaped projection 310 extends upward from the top 301 of the secondary container 300 and arcuately about the opening 304 through the top 301 of the secondary container 300. The projection 310 cooperates with the top 301 of the secondary container 300 to define an arcuate channel 311 which is inwardly open towards the opening 304. An arcuate rib 312 extends outwardly from the arcuate projection 310. The arcuate rib 312 is configured for slidable retention within the arcuate channel 211 defined by the arcuate projection 210 on the top 201 of the primary container 200. Positioning of the arcuate rib 312 within the arcuate channel 211 on the top 201 of the primary container 200 prevents the secondary container 300 from reciprocating within the primary container 200.

A cylindrical set of bristles 350 extend horizontally from a plate 340b which extends from the base 302 of the secondary container 300. The plate 340b is extended from the base 302 of the secondary container 300 by an extension leg 340a so as to provide a gap between the plate 340b and the base 302 of the secondary container 300 which accommodates an inlet orifice 362 through the base 302 of the secondary container 300. The bristles 350 are sized for storage within the lower portion 245c of the retainer compartment 245.

An outlet orifice 363 is provided through the sidewall 303 of the secondary container 300 proximate the top 301 of the secondary container 300 for providing fluid communication between the secondary chamber 360 and the inner annular cavity 361 when the secondary container 300 is sealingly retained within the primary central cylindrical cavity 281 and for providing fluid communication between the secondary chamber 360 and the atmosphere when the secondary container 300 is moved upward and reciprocated within the primary central cylindrical cavity 281.

A plunger 400 is reciprocally and sealingly retained within the secondary chamber 360 for drawing contaminated water into the system 100 and providing pressurized flow through the system 100. The plunger 400 includes (i) a head 410 which provides a horizontal surface for accommodating manual reciprocation of the plunger 400, (ii) a base 430 housed within the secondary chamber 360 which divides the secondary chamber 360 into an upper portion 360a and a lower portion 360b, and (iii) a shaft 420 extending through the opening 304 in the top 301 of the secondary container 300 and coupling the head 410 and the base 430.

A projection 421 extends transversely from the shaft 420 of the plunger 400 for cooperative engagement within the arcuate channel 311 defined by the L-shaped arcuate projection 310 on the top 301 of the secondary container 300. The transverse projection 421 is longitudinally positioned on the shaft 420 so that the projection 421 is longitudinally positioned for engagement within the arcuate channel 311 on the top 301 of the secondary container 300 when the base 430 of the plunger 400 is immediate the base 302 of the secondary container 300.

One end 313 of the arcuate channel 311 on the top 301 of the secondary container 300 is enclosed for abutting the transverse projection 421 on the plunger 400 so that rotation of the plunger 400 can cause rotation of the secondary container 300 for inserting or removing the arcuate rib 312 on the L-shaped projection 310 on the top 301 of the secondary container 300 from the arcuate channel 211 on the top 201 of the primary container 200.

Engagement of the transverse projection 421 on the shaft 420 of the plunger 400 in the arcuate channel 311 on the top 301 of the secondary container 300 causes the secondary container 300 and the plunger 400 to reciprocate as a single body within the primary container 200. Engagement of the arcuate rib 312 extending from the arcuate projection 310 on the top 301 of the secondary container 300 in the arcuate channel 211 on the top 201 of the primary container 200 prevents reciprocation of the secondary container 300 within the primary container 200.

An inlet passageway 440 extends from top 431 to bottom 432 through the base 430 of the plunger 400 for providing communication between the upper 360a and lower 360b portions of the secondary chamber 360. The inlet passageway 440 includes a valved portion 440a, a horizontal portion 440b and a vertical portion 440c. The valved portion 440a of the inlet passageway 440 through the base 430 of the plunger 400 is constructed similarly to the valved portion 260c of the inlet passageway 260 through the base 202 of the primary container 200 and includes an angled inner sidewall portion 442 against which a sphere 443 may seat when the plunger 400 is moved upward. The horizontal portion 440b of the inlet passageway 440 is provided to vertically offset the inlet passageway 440 from the shaft 420 so that the vertical portion 440c does not extend into the shaft 420 when completing the inlet passageway 440.

An annular primary seal 220 is provided in the top 201 of the primary container 200 for sealingly engaging the top 301 of the secondary container 300 and sealing passage between the inner annular cavity 361 and the atmosphere. An upper secondary annular seal 320 is provided in the top 301 of the secondary container 300 for sealingly engaging the shaft 420 of the plunger 400 and sealing passage between the upper portion 360a of the secondary chamber 360 and the atmosphere. A lower annular secondary seal 330 is provided in the base 302 of the secondary container 300 for sealingly engaging the middle portion 244b of the retainer inner sidewall surface 244 and sealing passage between the retainer compartment 245 and the inner annular cavity 361 when the secondary container 300 is completely retained within the primary central cylindrical cavity 281. A plunger seal 450 is provided in the sidewall 433 of the base 430 of the plunger 400 for sealingly engaging the sidewall 303 of the secondary container 300 and sealing passage around the base 430 of the plunger 400 between the upper 360a and lower 360b portions of the secondary chamber 360.

Operation

The system 100 is operated to produce potable water from contaminated water by (i) placing the tube 700 in fluid communication with a source of contaminated water with the plunger 400 fully inserted into the secondary chamber 360 and rotated so as to remove the transverse projection 421 on the shaft 420 of the plunger 400 from the arcuate channel 311 on the top 301 of the secondary container 300, (ii) pulling upward on the plunger 400 while maintaining the tube 700 in fluid communication with the source of contaminated water so as to draw contaminated water from the source of contaminated water through the inlet passageway 260 into the retainer compartment 245 and the lower portion 360b of the secondary chamber 360, (iii) pushing downward on the plunger 400 so as to cause the contaminated water contained within the retainer compartment 245 and the lower portion 360b of the secondary chamber 360 to flow [aa] through the inlet passageway 440 in the base 430 of the plunger 400, [bb] into the upper portion 360a of the secondary chamber 360, [cc] through the outlet orifice 363 in the sidewall 303 of the secondary container 300, [dd] into the inner annular cavity 361, [ee] through the filter media 500, [ff] into the outer annular cavity 282, [gg] past the retainer 240, [hh] through the biocidally effective material 600 and optional active component 650 retained in the uppermost section 283a of the lower portion 280b of the primary chamber 280, [jj] through the first screen 251, [kk] into the lowermost section 283b of the lower portion 280b of the primary chamber 280, [mm] through the outlet orifice 271, and [nn] out of the system 100 through the outlet passageway 270, (iv) again pulling upward on the plunger 400 while optionally maintaining the tube 700 in fluid communication with the source of contaminated water so as to simultaneously draw contaminated water from the source of contaminated water through the inlet passageway 260 and into the retainer compartment 245 and the lower portion 360b of the secondary chamber 360, and force the contaminated water retained within the upper portion 360a of the secondary chamber 360 through the sequence [cc] through [nn] listed above, and (v) repeating steps (iii) and (iv) until the desired quantity of potable water is produced.

It is noted that potable water is generated by the system 100 during both the upstroke and the downstroke of the plunger 400 such that the energy required to produce the potable water is spread between both the upstroke and the downstroke rather than concentrated on only one or the other as is typical for many manually operable water purification systems.

Potable water is produced when the plunger 400 is pushed downward because the shaft 420 of the plunger 400 occupies a gradually increasing portion of the void volume defined by retainer compartment 245 and the lower portion 360b of the secondary chamber 360 as the plunger 400 moves downward.

Potable water is produced when the plunger 400 is pulled upward because sphere 443 in the inlet passageway 440 through the base 430 of the plunger 400 prohibits flow from the upper portion 360a of the secondary chamber into the lower portion 360b of the secondary chamber 360 when the plunger 400 is pulled upwards.

Sphere 443 permits flow from the lower portion 360b of the secondary chamber 360 into the upper portion 360a of the secondary chamber 360 when the plunger 400 is pushed downward.

Similar to sphere 443, sphere 263 in the inlet passageway 260 functions as a one-way valve for permitting flow into the retainer compartment 245 and the lower portion 360b of the secondary chamber 360 when the plunger 400 is pulled upward while prohibiting flow out of the retainer compartment 245 and the lower portion 360b of the secondary chamber 360 when the plunger 400 is pushed downward.

The system 100 is operated to clean the filter 500 by (i) placing the tube 700 in fluid communication with a source of water (contaminated or purified) with the plunger 400 fully inserted into the secondary chamber 360, (ii) rotating the plunger 400 so that the plunger 400 and the secondary container 300 are coupled by placing the transverse projection 421 on the shaft 420 of the plunger 400 into the arcuate channel 311 on the top 301 of the secondary container 300, (iii) rotating the plunger 400 and secondary container 300 combination so that the secondary container 300 may be reciprocated within the primary container 200 by removing the arcuate rib 312 extending from the L-shaped projection 310 on the top 301 of the secondary container 300 from the arcuate channel 211 on the top 201 of the primary container 200, (iv) pulling upward on the plunger/secondary container combination 400/300 while maintaining the tube in fluid communication with the source of water so as to simultaneously draw water from the source of water through the inlet passageway 260 and into the primary central cylindrical cavity 281, and brush the inner surface 503 of the filter 500 with the bristles 350 so as to release contaminants entrapped against the inner surface 503 of the filter 500 and entrain the released contaminants in the water retained within the primary central cylindrical cavity 281, (v) pushing downward on the plunger 400 so as to again brush the inner surface 503 of the filter 500 with the bristles 350 and force the water within the primary central cylindrical cavity 281 which now contains the contaminants removed from the filter 500 to flow [aa] through the inlet orifice 362 in the base 302 of the secondary container 300, [bb] through the inlet passageway 440 in the base 430 of the plunger 400, [cc] into the upper portion 360a of the secondary chamber 360, and [dd] out of the system through the outlet orifice 363 in the sidewall 303 of the secondary container 300 which is in direct fluid communication with the atmosphere due to upward movement of the secondary container 300 with respect to the primary container 200, and (vi) repeating steps (ii) and (iii) until the desired removal of contaminants from the inner surface 503 of the filter 500 is obtained.

A clearance is provided between the sidewall 303 of the secondary container 300 and the filter 500. The clearance ensures unobstructed reciprocation of the secondary container 300 within the primary container 200 and provides a void volume above the bristles 350 which produces movement of contaminated water past the bristles 350 during cleaning as the contaminated water flows into and out from the void volume between the secondary container 300 and the filter 500.

SECOND EMBODIMENT

Nomenclature

1000: water purification system
1200: primary container
1201: top of primary container
1202: base of primary container
1203: sidewall of primary container
1204: opening through top of primary container
1205: annular channel in base of primary container
1206: O-ring stand
1210: L-shaped channels in top of primary container
1210a: longitudinal portion of L-shaped channels
1210b: lateral portion of L-shaped channels
1220: primary seal
1231: upper inner annular horizontal flange
1232: lower inner annular horizontal flange
1240: retainer
1241: top of retainer
1242: base of retainer
1243: sidewall of retainer
1244: inner surface of retainer sidewall
1244a: upper portion of retainer inner sidewall surface
1244b: middle portion of retainer inner sidewall surface
1244c: lower portion of retainer inner sidewall surface
1245: retainer compartment
1245a: upper portion of retainer compartment
1245b: middle portion of retainer compartment
1245c: lower portion of retainer compartment
1246: inner annular angled flange on retainer
1247: inlet orifice through base of retainer
1248: annular passageway between primary container sidewall and retainer sidewall
1249: outer annular flange on retainer sidewall
1251: first screen
1252: second screen
1260: inlet passageway through base of primary container
1260a: horizontal portion of inlet passageway
1260b: vertical portion of inlet passageway
1261: vertical conduit
1262: capped posts
1263: disc
1265: serrated coupling joint
1270: outlet passageway through base of primary container
1271: outlet orifice in base of primary container
1280: primary chamber
1280a: upper portion of primary chamber
1280b: lower portion of primary chamber
1281: primary central cylindrical cavity
1282: primary annular cavity
1283a: uppermost section of lower portion of primary chamber
1283b: lowermost section of lower portion of primary chamber
1290: annular skirt
1300: secondary container
1301: top of secondary container
1302: base of secondary container
1303: outer sidewall of secondary container
1304: opening through top of secondary container
1305: inner sidewall of secondary container
1306: top of inner sidewall of secondary container
1310: L-shaped channels in top of secondary container
1310a: longitudinal portion of L-shaped channels
1310b: lateral portion of L-shaped channels
1312: locking projections
1320: upper annular secondary seal
1330: lower annular secondary seal
1340: cylindrical central projection
1341: passageway through cylindrical central projection
1350: bristles
1360: secondary central cylindrical cavity
1360a: upper portion of secondary central cylindrical cavity
1360b: lower portion of secondary central cylindrical cavity
1362: inlet orifice through base of secondary container
1363: outlet orifice through outer sidewall of secondary container
1370: secondary annular cavity
1375: transitional annular cavity
1380: sloted annular cap
1381: horizontal portion of cap
1382: top surface of horizontal portion of cap
1383: bottom surface of horizontal portion of cap
1385: vertical portion of annular cap
1386: inner surface of horizontal portion of cap
1387: outer surface of horizontal portion of cap
1400: plunger
1410: handle of plunger
1411: first lateral end of handle
1412: second lateral end of handle
1413: longitudinal end of handle
1414: longitudinal passageway through handle
1415: lateral passageway through handle
1416: opening through second lateral end of handle
1417: internal flange within lateral passageway through plunger handle
1420: shaft of plunger
1421: locking projections
1422: longitudinal passageway through plunger shaft
1423: sphere
1430: base of plunger
1431: upper portion of plunger base
1431b: lower end of top portion of plunger base
1432: lower portion of plunger base
1432a: upper end of lower portion of plunger base
1433: gap between upper and lower portions of base
1441: passageway through upper portion of plunger base
1442: passageway through lower portion of plunger base
1443: disc
1450: plunger seal
1460: spindle
1461: proximal portion of spindle
1462: distal portion of spindle
1463: first annular flange on spindle
1464: second annular flange on spindle
1465: lateral passageway through spindle
1466: longitudinal passageway through spindle
1471: first spindle seal
1472: second spindle seal
1473: third spindle seal
1480: spring
1500: filter media
1501: top of filter media
1502: bottom of filter media
1503: inner surface of filter media
1504: outer surface of filter media 1600: biocidally effective material
1650: optional active component
1700: tube Construction The system 1000 includes (i) a cylindrical primary container 1200 which accommodates a cylindrical filter 1500 and a porous body of biocidally effective material 1600, (ii) a cylindrical secondary container 1300 reciprocally and sealably retained within the primary container 1200 for retaining a quantity of contaminated water (not shown) to be purified and including bristles 1350 for brushing the inner surface 1503 of the filter 1500 when the secondary container 1300 is reciprocated within the primary container 200, and (iii) a plunger 1400 reciprocally and sealably retained within the secondary container 1300 for drawing contaminated water into the secondary container 1300 and for forcing the contaminated water drawn into the secondary container 1300 through the filter 1500 and the porous body of biocidally effective material 1600.

The primary container 1200 defines a substantially cylindrical primary chamber 1280 extending from the top 1201 to the base 1202 of the primary container 1200. A central circular opening 1204 extends through the top 1201 of the primary container 1200 for providing access to the primary chamber 1280.

The base 1202 includes an annular channel 1205 for accommodating an O-ring 1206 which serves as a level stand.

A pair of diametrically opposed L-shaped channels 1210 are provided at the top 1201 of the primary container sidewall 1203 along the inner surface (unnumbered) of the sidewall 1203. The L-shaped channels include a longitudinal portion 1210a which extends through the top 1201 of the primary container 1200 and a lateral portion 1210b spaced from the top 1201 of the primary container 1200 by the length of the longitudinal portion 1210a.

The inner surface of the primary container sidewall 1203 proximate the top 1201 of the primary container 1200 is contoured to define upper 1231 and lower 1232 inner annular horizontal flanges which increase the diameter of the primary chamber 1280 as the chamber 1280 progresses towards the base 1202 of the primary container 1200.

A cylindrical retainer 1240 having an open top 1241 is provided within the primary chamber 1280. The retainer 1240 defines a substantially cylindrical, upwardly open compartment 1245. The retainer 1240 subdivides the primary chamber 1280 into an upper portion 1280a, a lower portion 1280b, the compartment 1245, and an annular passageway 1248 between the retainer sidewall 1243 and the primary container sidewall 1203 which interconnects the upper 1280a and the lower 1280b portions.

The inner surface 1244 of the retainer sidewall 1243 is configured to provide a downwardly and inwardly angled upper portion 1244a which defines an upper frustromal portion 1245a of the compartment 1245, a middle portion 1244b which defines a cylindrical middle portion 1245b of the compartment 1245, and a lower portion 1244c which defines a cylindrical lower portion 1245c of the compartment 1245. The lower section 1245c of the compartment 1245 has a slightly larger diameter than the middle section 1245b so as to define an inner annular downwardly and outwardly angled flange 1246 between the middle portion 1244b and the lower portion 1244c. The middle portion 1244b of the inner sidewall surface 1244 presents the innermost surface within the compartment 1245.

An inlet orifice 1247 is provided through the base 1242 of the retainer 1240.

A cylindrical filter 1500 is accommodated within the upper portion 1280a of the primary chamber 1280. The top 1501 of the filter 1500 is sealingly coupled by means of an O-ring seal 1220 to the upper inner annular horizontal flange 1231 defined by the sidewall 1203 of the primary container 1200. The bottom 1502 of the filter 1500 is adhesively bonded directly to an outer annular horizontal flange 1249 defined by the sidewall 1243 of the retainer 1240. The filter 1500 separates the upper portion 1280a of the primary chamber 1280 into a primary central cylindrical cavity 1281 and a primary annular cavity 1282 encircling the primary central cylindrical cavity 1281.

The inner surface 1503 of the filter 1500 and the inner surface 1244 of the retainer 1240 are substantially vertically aligned so that the primary central cylindrical cavity 1281 and the compartment 1245 extend continuously from the opening 1204 in the top 1201 of the primary container 1200 to the base 1242 of the retainer 1240.

An inlet passageway 1260 is provided through the base 1202 of the primary container 1200 for permitting the flow of contaminated water from a source of contaminated water into the compartment 1245. The inlet passageway 1260 includes a horizontal portion 1260a which extends through the base 1202 of the primary container 1200 and a vertical portion 1260b which extends from the horizontal portion 1260a through the base 1242 of the retainer 1240.

A serrated coupling joint 1265 is provided at the inlet passageway 1260 for retaining a flexible tube 1700 in fluid communication with the inlet passageway 1260.

A one-way disc valve 1263 is provided over the inlet orifice 1247 in the base 1242 of the retainer 1240. The disc 1263 permits fluid flow from inlet passage 1260 into retainer compartment 1245 but prevents fluid flow out of the retainer compartment 1245 and into the inlet passageway 1260. The disc 1263 prevents fluid flow out of the retainer compartment 1245 and into the inlet passageway 1260 by sealingly contacting the base of the retainer compartment 1245 when fluid flow is directed from the retainer compartment 1245 into the inlet passageway 1260.

The disc valve 1263 is retained in an operable position by four capped posts 1262 which surround the inlet orifice 1247 through the base of the retainer 1245. The capped posts 1262 limit both vertical and horizontal movement of the disc 1263 relative to the inlet orifice 1247.

The vertical 1260b portion of the inlet passageway 1260 is defined by a vertical conduit 1261 which also assists in supporting the retainer 1240 above the base 1202 of the primary container 1200. The vertical conduit 1261 occupies a central section of the lower portion 1280b of the primary chamber 1280 so as to shape the lower portion 1280b of the primary chamber 1280 as an annular cavity.

An outlet passageway 1270 is provided through the base 1202 of the primary container 1200 for permitting the flow of potable water out of the system 1000. An outlet orifice 1271 places the outlet passageway 1270 in fluid communication with the lower portion 1280b of the primary chamber 1280.

A first annular screen 1251 is positioned within the lower portion 1280b of the primary chamber 1280 for separating the lower portion 1280b into an uppermost section 1283a in direct fluid communication with the primary annular cavity 1282 and a lowermost section 1283b in direct fluid communication with the outlet passageway 1270 through the base 1202 of the primary container 1200.

The uppermost section 1283a of the lower portion 1280b of the primary chamber 1280 is packed sequentially with porous biocidally active material 1600 and an optional active component 1650. A second annular screen 1252 separates the biocidally effective material 1600 and the optional active component 1650. The first annular screen 1251 prevents the biocidally effective material 1600 from flowing out of the system 1000 through the outlet passageway 1270.

The base 1202 of the primary container 1200, retainer 1240 and filter 1500 are removable from within the primary container 1200 through the bottom of the primary container 1200 to facilitate replacement of the filter 1500, biocidally effective material 1600 and/or the optional active component 1650.

A cylindrical secondary container 1300 is reciprocally and sealingly retained within the primary central cylindrical cavity 1281 with a lowermost portion (unnumbered) reciprocally and sealingly retained within the retainer compartment 1245. The secondary container 1300 divides the primary central cylindrical cavity 1281 into a secondary central cylindrical chamber 1360 defined by the inner sidewall 1305 of the secondary container 1300, a secondary annular cavity 1370 between the inner 1305 and outer 1303 sidewalls of the secondary container 1300, and a transitional annular cavity 1375 between the outer sidewall 1303 of the secondary container 1300 and the filter 1500.

A pair of diametrically opposed L-shaped channels 1310 are provided at the top 1301 of the secondary container outer sidewall 1303 along the inner surface (unnumbered) of the sidewall 1303. The L-shaped channels include a longitudinal portion 1310a which extends through the top 1301 of the secondary container 1300 and a lateral portion 1310b spaced from the top 1301 of the secondary container 1300 by the length of the longitudinal portion 1310a.

A pair of diametrically opposed locking projections 1312 extends outwardly from the outer sidewall 1303 of the secondary container. The locking projections are configured and arranged for insertion into and removal from the diametrically opposed L-shaped channels 1210 provided at the top 1201 of the primary container 1200. Positioning of the locking projections 1312 extending from secondary container 1300 within the L-shaped channels 1210 provided at the top 1201 of the primary container 1200 prevents the secondary container 1300 from reciprocating within the primary container 1200.

A cylindrical set of bristles 1350 extend horizontally from a cylindrical central projection 1340 which extends downwardly from the base 1302 of the secondary container 1300. The central projection 1340 is spaced from the base 1302 of the secondary container 1300 so as to provide a passageway 1341 between the central projection 1340 and the base 1302 of the secondary container 1300 which accommodates an inlet orifice 1362 through the base 1302 of the secondary container 1300. The bristles 1350 are sized for storage within the lower portion 1245c of the retainer compartment 1245.

A slotted annular cap 1380 is provided over the top 1301 of the secondary container 1300 for retentatively positioning the upper annular secondary seal 1320 and the top 1306 of the inner sidewall 1305 of the secondary container 1300. The top surface 1382 of the horizontal portion 1381 of the cap 1380 is flat for sealingly engaging the upper annular secondary seal 1320. Likewise, the outer surface 1387 of the vertical portion 1385 of the cap 1380 is flat for sealingly engaging the sidewall 1303 of the secondary container 1300. In contrast, the bottom surface 1383 of the horizontal portion 1381 and the inner surface 1386 of the vertical portion 1385 are sloted to permit fluid flow between the secondary central cylindrical cavity 1360 and the secondary annular cavity 1370.

An outlet orifice 1363 is provided through the outer sidewall 1303 of the secondary container 1300 proximate the base 1302 of the secondary container 1300 for providing fluid communication between the secondary annular cavity 1370 and the transitional annular cavity 1375.

A plunger 1400 is reciprocally and sealingly retained within the secondary central cylindrical cavity 1360 for drawing contaminated water into the system 1000 and providing pressurized flow through the system 1000. The plunger 1400 includes (i) a handle 1410 which provides a horizontal surface for accommodating manual reciprocation of the plunger 1400, (ii) a base 1430 housed within the secondary central cylindrical cavity 1360 which divides the cavity 1360 into an upper portion 1360a and a lower portion 1360b, (iii) a shaft 1420 extending through the opening 1304 in the top 1301 of the secondary container 1300 which connects the handle 1410 and the base 1430, (iv) a sequence of interconnected passageways 1442, 1441, 1422, 1414 and 1415 through the base 1430, shaft 1420 and handle 1410 of the plunger 1400 for permitting flow of contaminated water from either the secondary central cavity 1360 or the primary central cavity 1281 through the plunger 1400 and out of the system 1000, and (v) a biased spindle 1460 for controlling flow through the sequence of interconnected passageways 1442, 1441, 1422, 1414 and 1415 in the plunger 1400.

A pair of diametrically opposed locking projections 1421 extend transversely from the shaft 1420 of the plunger 1400. The locking projections 1421 are configured and arranged for insertion into and removal from the diametrically opposed L-shaped channels 1310 provided at the top 1301 of the secondary container 1300. Positioning of the locking projections 1421 extending from plunger 1400 within the L-shaped channels 1310 provided at the top 1301 of the secondary container 1300 causes the plunger 1400 and the secondary container 1300 to reciprocate as a single body within the primary container 1200.

The base 1430 of the plunger 1400 includes an upper portion 1431 and a lower portion 1432 which are separated by a gap 1433. A passageway 1441, 1442 extends through each of the base portions 1431, 1432 respectively. A one-way disc valve 1443 is provided within the gap 1433 for controlling flow between the upper 1360a and lower 1360b portions of the secondary central cylindrical cavity 1360. The upper end 1432a of the lower portion 1432 of the plunger base 1440 is flat for sealingly contacting the disc 1443. In contrast, the lower end 1431b of the upper portion 1431 of the plunger base 1440 is sloted to prevent the disc 1443 from sealingly contacting the upper portion 1431. During upstroke of the plunger 1400, the disc 1443 seats against the upper end 1432a of the lower portion 1432 of the plunger base 1440 and prevents fluid flow from the upper portion 1360a to the lower portion 1360b of the secondary central cylindrical cavity 1360. During downstroke of the plunger 1400, the disc 1443 seats against the lower end 1431b of the upper portion 1431 of the plunger base 1440 and allows fluid flow from the lower portion 1360b to the upper portion 1360a of the secondary central cavity 1360 through the passageway 1442 in the lower portion 1432 of the plunger base 1400.

The shaft 1420 includes a central passageway 1422 in fluid communication with the passageway 1441 in the upper portion 1431 of the base 1430 which extends the entire length of the shaft 1420 from the base 1430 to the handle 1410.

The handle includes a central longitudinal passageway 1414 in fluid communication with the passageway 1422 in the shaft 1420 and a central lateral passageway 1415 in fluid communication with the longitudinal passageway 1414. The lateral passageway 1415 extends continuously from the first end 1411 to the second end 1412 of the handle 1410.

A laterally extending spindle 1460 is positioned within the lateral passageway 1415 through the handle 1410 for controlling fluid flow through the lateral passageway 1415 and out of the system 1000. A proximal portion 1461 of the spindle 1460 extends from the first end 1411 of the handle 1410 while the distal portion 1462 is aligned with an orifice 1416 in the second end 1411 of the handle 1410. A first spindle seal 1471 is provided between the first end 1411 of the handle 1410 and the junction of the longitudinal 1414 and lateral 1415 passageways in the handle 1410 for preventing flow through the lateral passageway 1415 towards the first end 1411 of the handle 1410. A distal portion 1462 of the spindle 1460 includes a laterally extending central passageway 1465 which extends completely through the distal end of the spindle 1460. The laterally extending central passageway 1465 through the spindle 1460 is in fluid communication with the lateral passageway 1415 through the plunger handle 1410 by means of a longitudinally extending passageway 1466 in the spindle 1460. Second 1472 and third 1473 spindle seals are positioned on either side of the longitudinally extending passageway 1466 in the spindle 1460. The second spindle seal 1472 is sandwiched between a laterally repositionable first annular flange 1463 on the spindle 1460 and a stationary internal flange 1417 on the handle 1410 for controlling fluid flow from the lateral passageway 1415 in the handle 1410 to the longitudinal passageway 1466 in the spindle 1460 based upon lateral movement of the spindle 1460. The third spindle seal 1473 prevents continued flow through the lateral passageway 1415 in the plunger handle 1410 towards the second end 1412 of the plunger handle 1410 regardless of the lateral position of the spindle 1460.

Spindle 1460 is biased in a sealing position towards the first end 1411 of the plunger handle 1410 by a spring 1480 which surrounds the distal portion 1462 of the spindle 1460 and is compressed between the second end 1412 of the plunger handle 1410 and a second annular flange 1464 on the spindle 1460.

Fluid flow is sequentially provided through the lateral passageway 1415 in the plunger handle 1410, the longitudinal passageway 1466 in the spindle 1460, and the lateral passageway 1465 in the spindle 1460 by simply depressing the proximal end 1461 of the spindle 1460 towards the plunger handle 1410 and against the bias of spring 1480. Such lateral repositioning of the spindle 1460 causes the first annular flange 1463 on the spindle 1460 to separate from the inner annular flange 1417 on the plunger handle 1410 so as to permit flow around the second spindle seal 1472 and extends the distal end 1462 of the spindle 1460 through the orifice 1416 in the second end 1412 of the handle 1410.

The spindle 1460 also serves as a pressure release valve should excessive pressure develope within the system 1000. Pressure within the system 1000 would move the spindle 1460 so as to permit venting out of the system 1000 around the second spindle seal 1472 when the pressure increased such that the force created by the pressure ($lb_f/in_2$) acting laterally upon the exposed annular surface area of the second spindle seal 1472 ($in^2$) would be sufficient to overcome the biasing force of the spring 1480.

A free floating sphere 1423 is provided within the longitudinal central passageway 1422 of the plunger shaft 1420 for sealingly engaging and preventing flow from the longitudinal central passageway 1422 in the plunger shaft 1420 through the passageway 1441 in the top portion 1431 of the plunger base when the spindle 1460 is depressed for permitting flow past the second spindle seal 1472 and the plunger 1400 is being withdrawn. The longitudinal distal end 1413 of the plunger handle 1410 is sloted for preventing the sphere 1423 from sealingly engaging and preventing flow from the longitudinal central passageway 1422 in the plunger shaft 1420 through the longitudinal 1414 and lateral 1415 passageways in the plunger handle 1410 when the spindle 1460 is depressed for permitting flow past the second spindle seal 1472 and the plunger 1400 is being inserted.

The annular primary seal 1220 provided in the top 1201 of the primary container 1200 sealingly engages the outer sidewall 1303 of the secondary container 300 for preventing flow from the transitional annular cavity 1375 to the atmosphere. An upper annular secondary seal 1320 is provided proximate the top 1301 of the secondary container 1300 for sealingly engaging the shaft 1420 of the plunger 1400 and preventing flow from the upper portion 1360a of the secondary central cylindrical cavity 1360 and the secondary annular cavity 1370 to the atmosphere. A lower annular secondary seal 1330 is provided in the base 1302 of the secondary container 1300 for sealingly engaging the middle portion 1244b of the retainer inner sidewall surface 1244 and preventing flow between the retainer compartment 1245 and the first transitional annular cavity when the secondary container 1300 is completely retained within the primary central cylindrical cavity 1281. A plunger seal 1450 is provided in the lower portion 1432 of the plunger base 1430 for sealingly engaging the inner sidewall 1305 of the secondary container 1300 and preventing flow between the upper portion 1360a and the lower portion 1360b of the secondary central cylindrical cavity 1360 except through the passageway 1442 in the lower portion 1432 of the plunger base 1430.

A flexible, annular skirt 1290 is provided within the annular passageway 1248 between the primary container 1200 and the retainer 1240. The skirt 1290 extends from the outside surface 1504 of the filter 1500 proximate the bottom 1502 of the filter 1500 in a outward and downward fashion into abutment with the sidewall 1203 of the primary container 1200. The skirt permits flow from the primary annular cavity 1282 to the lower portion 1280b of the primary chamber 1280 through the annular passageway 1248 between the primary container 1200 and the retainer 1240 but prevents return flow from the lower portion 1280b of the primary chamber 1280 to the primary annular cavity 1282. This feature prevents the suction of purified water and/or air into the system 1000 through the outlet passageway 1270 during an upward stroke of the plunger 1400 and the secondary container 1300 while cleaning of the filter 1500.

Such suction of purified water and/or air into the system 1000 may also be provided by a check valve (not shown) in the product tubing 1700.

Operation

The system 1000 is operated to produce potable water from contaminated water by (i) placing the tube 1700 in fluid communication with a source of contaminated water with the plunger 1400 fully inserted into the secondary chamber 1360 and rotated so as to remove the locking projections 1421 on the shaft 1420 of the plunger 1400 from the L-shaped channels 1310 in the secondary container 1300, (ii) pulling upward on the plunger 1400 while maintaining the tube 1700 in fluid communication with the source of contaminated water so as to draw contaminated water from the source of contaminated water through the tube 1700 and the inlet passageway 1260 into the retainer compartment 1245 and the lower portion 1360b of the secondary chamber 1360, (iii) pushing downward on the plunger 1400 so as to cause the contaminated water contained within the retainer compartment 1245 and the lower portion 1360b of the secondary chamber 1360 to flow [aa] through the passageway 1442 in the bottom portion 1432 of the plunger base 1430, [bb] into the upper portion 1360a of the secondary chamber 1360, [cc] through the outlet orifice 1365 in the inner sidewall 1305 of secondary container 1300, [dd] into the secondary annular cavity 1370 [ee] through the outlet orifice 1363 in the outer sidewall 1303 of secondary container 1300, [ff] into the transitional cavity 1375, [gg] through the filter media 1500, [hh] into the primary annular cavity 1282, [jj] through the annular passageway 1248 between the primary container 1200 and the retainer 1240, [kk] past the skirt 1290, [mm] through the biocidally effective material 1600 and optional active component 1650 retained in the uppermost section 1283a of the lower portion 1280b of the primary chamber 1280, [nn] through the second screen 1252, [oo] into the lowermost section 1283b of the lower portion 1280b of the primary chamber 1280, [pp] through the outlet orifice 1271, and [qq] out of the system 1000 through the outlet passageway 1270, (iv) again pulling upward on the plunger 1400 while optionally maintaining the tube 1700 in fluid communication with the source of contaminated water so as to simultaneously draw contaminated water from the source of contaminated water through the tube 1700 and the inlet passageway 1260 into the retainer compartment 1245 and the lower portion 1360b of the secondary chamber 1360, and force the contaminated water retained within the upper portion 1360a of the secondary chamber 1360 through the sequence [cc] through [qq] listed above, and (v) repeating steps (iii) and (iv) until the desired quantity of potable water is produced.

As with the first embodiment, it is noted that potable water is generated by the system 1000 during both the upstroke and the downstroke of the plunger 1400 based upon the same principle explained with respect to the first embodiment.

Disc 1443 seats against the bottom portion 1432 of the plunger base 1430 and prevents flow from the upper portion 1360a of the secondary chamber 1360 into the lower portion 1360b of the secondary chamber 1360 only during upstroke of the plunger 1400.

Similar to disc 1443, disc 1263 over the inlet orifice 1247 in the base 1242 of the retainer 1240 seats against the base 1242 of the retainer 1240 and prevents flow from the retainer compartment 1245 and the lower portion 1360b of the secondary chamber 1360 out of the system 1000 through the inlet passageway 1260 only during downstroke of the plunger 1400.

The system 1000 is operated to clean the filter 1500 by (i) placing the tube 1700 in fluid communication with a source of contaminated water with the plunger 1400 fully inserted into the secondary chamber 1360, (ii) rotating the plunger 1400 so as to position the locking projections 1421 on the shaft 1420 of the plunger 1400 within the lateral portion 1310b of the L-shaped channels 1310 in the secondary container 1300 and thereby coupling the plunger 1400 and the secondary container 1300, (iii) rotating the plunger 1400 and secondary container 1300 combination so as to position the locking projections 1312 on the secondary container 1300 outside of the L-shaped channels 1210 in the primary container 1200 and thereby permitting the plunger 1400 and secondary container 1300 combination to be reciprocated within the primary container 1200, (iv) pulling upward on the plunger/secondary container combination 1400/1300 while maintaining the tube 1700 in fluid communication with the source of contaminated water so as to simultaneously [aa] draw contaminated water from the source of contaminated water through the inlet passageway 1260 and into the primary central cylindrical cavity 1281, and [bb] brush the inner surface 1503 of the filter 1500 with the bristles 1350 so as to remove contaminants entrapped against the inner surface 1503 of the filter 1500 and entrain the released contaminants in the contaminated water drawn into the primary central cylindrical cavity 1281, (v) pushing in on the proximal end 1461 of the spindle 1460 so as to permit fluid flow out of the system 1000 through the outlet orifice 1416 in the handle 1410, (vi) pushing downward on the plunger 1400 so as to simultaneously [aa] brush the inner surface 1503 of the filter 1500 with the bristles 1350, and [bb] force the contaminated water within the primary central cylindrical cavity 1281 which now contains the contaminants removed from the filter 1500 to flow [1] through the inlet orifice 1362 in the base 1302 of the secondary container 1300, [2] through the passageway 1442 in the bottom portion 1432 of the plunger base 1430, [3] through the peripheral apertures 1444 in the disc 1443, [4] through the passageway 1441 in the top portion 1431 of the plunger base 1430, [5] through the longitudinal passageway 1422 in the plunger shaft 1420, [6] through the longitudinal passageway 1414 in the plunger handle 1410, [7] into the portion of the lateral passageway 1415 in the plunger handle 1400 between the first 1471 and third 1473 spindle seals, [8] through the longitudinal passageway 1466 in the spindle 1460, [9] through the lateral passageway 1465 in the spindle 1460, and [10] out of the system 1000 through the outlet orifice 14 the handle 1410, (vi) repeating steps (iv) and (vi) with the spindle 1460 continuously depressed until the desired removal of contaminants from the inner surface 1503 of the filter 1500 is obtained.

Sphere 1423 seals against the top portion 1431 of the plunger base 1430 when the spindle 1460 is depressed and the plunger 1400 is being withdrawn in order to prevent the suction of air into the system through the outlet orifice 1416 in the plunger handle 1410.

A clearance is provided between the sidewall 1303 of the secondary container 1300 and the filter 1500. The clearance ensures unobstructed reciprocation of the secondary container 1300 within the first container 1200 and provides a void volume above the bristles 1350 which provides for the flow of contaminated water past the bristles 1350 during the cleaning cycle as the contaminated water flows into and out from this void volume between the secondary container 1300 and the filter 1500.

FIRST AND SECOND EMBODIMENTS

The primary container 200, 1200, secondary container 300, 1300, plunger 400, 1400, retainer 240, 1240, vertical conduit 261, 1261, serrated coupling joint 1265, and spindle 1460 may be constructed from any suitable structural material including wood, metal and plastic with plastic constituting the material of choice.

The filter 500, 1500 functions to remove both suspended solids and larger pathogens from the contaminated water. Removal of the suspended solids renders the water aesthetically agreeable and palatably acceptable. Generally, removal of those suspended solids which are visible to the naked eye (greater than about 40 microns) achieves the desired results. Removal of the larger pathogens is necessary because such pathogens are effectively resistant to chemical disinfection by the biocidally effective material 600, 1600. The larger pathogens generally resistant to chemical disinfection are cysts such as Giardia lamblia and Giardia muris which are typically about 6 microns in size. Because of the significantly smaller size of the pathogens which must be removed (6 microns) as compared to the suspended solids (40 microns), pathogen removal controls selection of the filter media 500, 1500.

The U.S. Environmental Protection Agency recommends that microbiological water purifiers achieve at least a three-log (99.9%) reduction in the concentration of cysts such as Giardia lamblia and Giardia muris which are difficult to control by chemical means. Accordingly, the filter media 500, 1500 employed in the present invention should be capable of ensuring at least a three-log reduction in the concentration of cysts such as Giardia lamblia and Giardia muris.

The filter 500, 1500 may be constructed from any porous material capable of providing the proper pore sizes and possessing the necessary structural integrity including cellulose, fiberglass, porous plastic, carbon, sintered metal, ceramic, diatomaceous earth, and the like.

The biocidally effective material 600, 1600 may be any sufficiently porous material capable of disinfecting water contaminated with harmful pathogens which are small enough to pass through the filter 500, 1500. The material must be capable of destroying the pathogens with a single pass of the water through the material. Examples of biocidally effective material suitable for use in the present invention are disclosed in U.S. Pat. Nos. 4,238,477 and 3,817,860 issued to Lambert et al., U.S. Pat. Nos. 4,594,392 and 4,187,183 issued to Hatch, U.S. Pat. No. 4,076,622 issued to Costin, and U.S. Pat. No. 4,420,590 issued to Gartner. Briefly, the material disclosed in these patents are halogenated anion exchanged resins which are effective for disinfecting contaminated water by percolation of the contaminated water through the resin.

The amount of biocidally effective material 600, 1600 which should be employed within the system 100, 1000 depends upon a number of factors including the type and porosity of the biocidally effective resin, the configuration of the biocidally effective resin within the system 100, 1000, the rate of water flow through the system 100, 1000, and others. Generally, when an iodinated anion exchange resin is employed, the volumetric ratio of resin to water passing through the resin every second should be at least about 2.5 and preferably at least 3.

The screens 251, 252, 1251, 1252 may be constructed from any suitably porous material capable of retaining the biocidally effective material 600, 1600 in the uppermost section 283a, 1283a of the lower portion 280b, 1280b of the primary chamber 280, 1280 while permitting substantially unrestricted flow of potable water through the screens 251, 252, 1251, 1252. Suitable materials for use as a screen 251, 252, 1251, 1252 in the present invention include woven and nonwoven fibers of plastic, glass or other material which is chemically compatible with the biocidally effective material 600, 1600.

The system 100, 1000 may be constructed to substantially any size. Selection of the desired size requires a balancing of the competing interests of capacity, available power and transportability. A system providing a secondary chamber 360, 1360 of about 100 to about 500 ml provides an effective balance between these competing interests for those systems 100, 1000 intended to be manually transported for extended periods such as required for backpacking.

A stationary system 100, 1000 may also be constructed such as for household use. The competing interests in selection of the size of such stationary systems 100, 1000 are capacity and cost.

Depending upon the exact material of construction, a system 100, 1000 providing a secondary chamber 360, 1360 of about 100 to about 500 ml will typically weight about 500 to about 2500 grams and be capable of providing up to about 2 liters of purified water per minute under standard operating conditions.

The frequency with which the filter 500, 1500 should be cleaned and the number of repetitions during each cleaning cycle depends upon the extent to which the contaminated water is contaminated with materials which will be entrapped against the filter 500, 1500. Typically, the filter 500, 1500 should be cleaned after the purification of about 1 to about 1000 liters of water with the bristles reciprocated about 3 to 10 ten times during each cleaning cycle. Under use of the cleaning cycle unnecessarily reduces efficiency the system 100, 1000 while overuse of the cleaning cycle unnecessarily hastens deterioration of the filter 500, 1500.

The specification is presented to aid in a complete nonlimiting understanding of the invention. Since many variations and embodiments of the inventions can be made without departing from spirit and scope of the invention, the invention resides in the claims hereinafter appended.

I claim:

1. An apparatus for producing potable water from contaminated water comprising:
   a primary container defining a primary chamber,

23 a filter sealingly dividing the primary chamber into a first cavity and a second cavity with a first surface of the filter facing the first cavity and a second surface of the filter facing the second cavity, a means retained within the first cavity for removing contaminants entrapped against the first surface of the filter, and a manually operable plunger receivable within the first cavity and comprising a means for forcing contaminated water retained within the first cavity through the filter when in a first mode and a means for activating the contaminant removal means for removing contaminants entrapped against the first surface of the filter when in a second mode: wherein the first and second modes are mutually exclusive.

2. The apparatus of claim 1 further comprising a body of biocidally effective material retained within the second cavity for chemically disinfecting the water.

3. The apparatus of claim 2 wherein (i) the filter comprises a means for filtering contaminated water so as to produce at least a three-log reduction in the concentration of Giardia Lamblia within the water without significantly reducing the concentration of bacteria and viruses within the water, and (ii) the body of biocidally effective material comprises a means for treating contaminated water so as to produce at least a three-log reduction in the concentration of active bacteria and viruses in the water.

4. The apparatus of claim 2 wherein (i) the filter comprises a means for filtering contaminated water so as to produce at least a 99.9% reduction in the concentration of pathogens which are larger than about 4 microns without producing a significant reduction in the concentration of pathogens which are less than about 0.5 microns, and (ii) the body of biocidally effective material comprises a means for treating contaminated water so as to produce at least a three-log reduction in the concentration of active bacteria and viruses in the contaminated water.

5. The apparatus of claim 2 wherein the body of biocidally effective material comprises a porous body of biocidally effective halogenated anion exchange resin.

6. An apparatus for producing potable water from contaminated water comprising:

a primary container defining a primary chamber, a filter sealingly dividing the primary chamber into a first cavity and a second cavity with a first surface of the filter facing the first cavity and a second surface of the filter facing the second cavity, an inlet passageway in the primary container through which the first cavity may be supplied with contaminated water from a contaminated water source, a first outlet passageway in fluid communication with the first cavity, a second outlet passageway in fluid communication with the second cavity, a means within the first cavity for removing contaminants entrapped against the first surface of the filter, a plunger reciprocally and sealingly engaged within the first cavity comprising a means for forcing contaminated water retained within the first cavity through the filter, into the second cavity, and out of the apparatus through the second outlet passageway, when in a first operational mode and removing contaminants entrapped against the first surface of the filter with the contaminant removal means, entraining the removed contaminants in contaminated water, and forcing the contaminated water containing the entrained removed contaminants out of the apparatus through the first outlet passage when in a second operational mode: wherein the first and second modes are mutually exclusive.

7. The apparatus of claim 6 further comprising a body of biocidally effective material retained within the second cavity for disinfecting water after passage of the water through the filter.

8. The apparatus of claim 6 wherein the primary chamber and filter are substantially cylindrical so as to define a substantially cylindrical first cavity and a substantially annular second cavity encircling the first cavity.

9. The apparatus of claim 6 wherein the inlet passageway includes a one-way valve for permitting flow into the first cavity while prohibiting flow out of the first cavity.

10. The apparatus of claim 6 wherein the means for removing entrapped contaminants comprises a means for brushing the first surface of the filter.

11. The apparatus of claim 10 wherein the brushing means comprises bristles.

12. An apparatus for producing potable water from contaminated water comprising:

a primary container defining a primary chamber, a receptacle within the primary chamber dividing the primary chamber into a first chamber and a second chamber, a porous body of biocidally effective material retained within the second chamber for disinfecting contaminated water, a filter sealingly dividing the first chamber into a first cavity and a second cavity with a first surface of the filter facing the first cavity and a second surface of the filter facing the second cavity, a secondary container having an internal surface and an external surface which is reciprocally and sealingly retained within the first cavity and divides the first cavity into a first volume within the secondary container and a second volume between the secondary container and the filter, an inlet passageway in direct fluid communication with the first volume for permitting introduction of contaminated water into the first volume from a contaminated water source, a one-way valve in the inlet passageway comprising means for permitting flow of contaminated water into the first volume through the inlet passageway while prohibiting flow of contaminated water out of the first volume through the inlet passageway, a first outlet passageway through the secondary container, a second outlet passageway comprising means for permitting fluid flow from the second cavity to the second chamber, a third outlet passageway through the primary container comprising means for permitting fluid flow from the second chamber to the atmosphere, a means on the external surface of the secondary container for moving within the second volume and removing contaminants entrained against the first surface of the filter when the secondary container is reciprocated within the first cavity, a manually operable plunger reciprocally and sealingly retained within the first volume wherein the plunger is (i) reciprocable within the first volume, when in a first operational mode, for forcing contaminated water retained within the first volume through the first outlet passageway, into the second volume, through the filter, into the second cavity, through the second outlet passageway, into the second chamber, through the biocidally effective material, and out of the apparatus through the third outlet passageway, and (ii) reciprocable within the first volume, when in a second operational mode, for reciprocating the secondary container within the first cavity so as to remove contaminants entrapped against the first surface of the filter, entrain the removed contaminants in contaminated water, and force the contaminated water containing the entrained removed contaminants out of the apparatus through the first outlet passageway.

13. An apparatus for producing potable water from contaminated water comprising:
   a primary container defining a primary chamber,
   a receptacle within the primary chamber dividing the primary chamber into a first chamber and a second chamber,
   a porous body of biocidally effective material positioned within the second chamber for disinfecting contaminated water,
   a filter sealingly dividing the first chamber into a first cavity and a second cavity with a first surface of the filter facing the first cavity and a second surface of the filter facing the second cavity,
   a secondary container reciprocally and sealingly retained within the first cavity and dividing the first cavity into a first volume within the secondary container and a second volume between the secondary container and the filter,
   an inlet passageway in fluid communication with the first volume for permitting introduction of contaminated water into the first volume from a contaminated water source,
   a one-way valve in the inlet passageway comprising means for permitting flow of contaminated water into the first volume through the inlet passageway while prohibiting flow of contaminated water out of the first volume through the inlet passageway,
   a first outlet passageway comprising means for permitting fluid flow from the first volume to the second volume,
   a second outlet passageway comprising means for permitting fluid flow from the second cavity to the second chamber,
   a third outlet passageway comprising means for permitting fluid flow from the second chamber to the atmosphere,
   a fourth outlet passageway comprising means for permitting fluid flow from the first cavity to the atmosphere,
   a manually operable valve in the fourth outlet passageway comprising means for controlling flow of contaminated water through the fourth outlet passageway,
   a mean on the external surface of the secondary container for moving within the second volume and removing contaminants entrained against the first surface of the filter when the secondary container is reciprocated within the first cavity,
   a manually operable plunger reciprocally and sealingly retained within the first volume wherein the plunger comprises means for (i) forcing contaminated water retained within the first volume through the first outlet passageway, into the second volume, through the filter, into the second cavity, through the second outlet passageway, into the second chamber, through the biocidally effective material, and out of the apparatus through the third outlet passageway when in a first operational mode, and (ii) removing contaminants entrapped against the first surface of the filter, entraining the removed contaminants in contaminated water, and forcing the contaminated water containing the entrained removed contaminants out of the apparatus through the fourth outlet passageway when in a second operational mode.

* * * * *